(12) United States Patent
Pirvu

(10) Patent No.: US 8,533,712 B2
(45) Date of Patent: Sep. 10, 2013

(54) VIRTUAL MACHINE STAGE DETECTION

(75) Inventor: Marius Pirvu, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 12/896,155

(22) Filed: Oct. 1, 2010

(65) Prior Publication Data

US 2012/0084776 A1 Apr. 5, 2012

(51) Int. Cl.
*G06F 9/455* (2006.01)

(52) U.S. Cl.
USPC .............................................................. 718/1

(58) Field of Classification Search
USPC ............................................................. 718/1
See application file for complete search history.

(56) References Cited

U.S. PATENT DOCUMENTS

| | | | |
|---|---|---|---|
| 6,289,506 B1 | 9/2001 | Kwong et al. | |
| 6,971,091 B1 | 11/2005 | Arnold et al. | |
| 2007/0033578 A1 | 2/2007 | Arnold et al. | |
| 2008/0086285 A1 | 4/2008 | Gombas et al. | |
| 2010/0114825 A1 | 5/2010 | Siddegowda | |

FOREIGN PATENT DOCUMENTS

WO WO/2005/096152 10/2005

OTHER PUBLICATIONS

Nagpurkar, et al; Online Phase Detection Algorithms; International Symposium on Code Generation and Optimization; 2006; IEEE.
Dufour, et al; Dynamic Metrics for Java; OOPSLA '03; Oct. 26-30, 2003; Anaheim, CA, USA.
Wimmer, et al; Phase Detection using Trace Compilation; PPPJ '09; Aug. 27-28, 2009; Calgary, Alberta, Canada.
Orlando, S., et al; Java Virtual Machine Monitoring for Dependability Benchmarking; 9th IEEE International Symposium, Gyeongju, Korea, Apr. 24-26, 2006; pp. 433-440; Piscataway, NJ, USA; ISBN 978-0-7695-2561-7.
Burke, M.G., et al; The Jalapeno Dynamic Optimizing Compiler for Java; ACM 1999 Conference on Java Grande; San Francisco, CA, USA; Jun. 12-14, 1999; pp. 129-141; ISBN 978-1-58113-161-1.
Ratanaworabhan, Paruj; Program Phase Detection based on Critical Basic Block Transitions; ISPASS 2008.
Dhodapkar, A.S.; Comparing Program Phase Detection Techniques; International Symposium on Microarchitecture; Dec. 2003.
Wimmer, Christian; Phase Detection Using Trace Compilation; International Conference on Principles and Practice of Programming in Java; 2009.
Dhodapkar, A.S.; Managing Multi-Configuration Hardware via Dynamic Working Set Analysis; International Symposium on Computer Architecture; 2002.
Duesterwald, E.; Characterizing and Predicting Program Behavior and its Variability; International Conference on Parallel Architectures and Compilation Techniques; 2003.
Sherwood, T.; Phase Tracking and Prediction; SIGARCH Comput. Archit. News 31,2; May 2003.

*Primary Examiner* — Mengyao Zhe
(74) *Attorney, Agent, or Firm* — David Mims; Robert C. Rolnik

(57) ABSTRACT

A computer system and computer program product for categorizing a virtual machine stage. A data processing system starts a virtual machine. It sets factor-stage ranges, wherein for each combination factor and stage, a corresponding range is present, and wherein each range is as broad as a reset range. It sets a frequency for sampling virtual machine metrics and samples virtual machine metrics to form a plurality of virtual machine metrics for each factor. It applies a value to each range satisfied by each virtual machine metric, to form a plurality of stage-qualifying values corresponding to a range, and sums all stage-qualifying values for each stage, to form a stage likelihood. The data processing system further selects a stage corresponding a highest stage likelihood. The data processing system determines if the current range is different from a former range. The system expands each range corresponding to the current stage.

16 Claims, 4 Drawing Sheets

FIG. 6A

|  | STARTUP | IDLE 622 | RAMP-UP | STEADY | DEEP STEADY |
|---|---|---|---|---|---|
| Number of pending JIT compilation requests 601 | 640 0 - 2000 | 0 - 1 | 4 or more | 0 - 3 | 0 - 3 |
| Arrival rate for first time compilations | 7 or more | 0 - 5 | 0 - 200 | 0 - 10 | 0 - 10 |
| Arrival rate of recompilation requests | 0 - 2 | 0 | 2 or more | 0 - 2 | 0 - 2 |
| Class loading rate 604 | 300 or more | 0 | 0 - 300 | 0 - 5 | 0 - 5 |
| Samples in compiled code 605 | 0 - 50 | 0 - 5 | 10 - 200 | 10 or more | 10 or more |
| Samples in interpreted code 606 | 1 - 100 | 0 - 5 | 0 - 50 | 0 - 10 | 0 - 10 |
| Number of active threads 607 | 1 or more | 0 | 1 or more | one or more | one or more |
| CPU utilization of executing process 608 | 5 - 100 | 0 - 1 | 10 - 100 | 10 - 100 | 10 - 100 |
| Duration in steady stage | 0 | 0 | 0 | 0 | 5 minutes or more |

FIG. 6B

|  | 655 VIRTUAL MACHINE METRIC | 656 STARTUP | IDLE | RAMP-UP | STEADY | DEEP STEADY |
|---|---|---|---|---|---|---|
| Number of pending JIT compilation requests 651 |  | 658 1005 | 1 | 5 | 1 | 0 | 0 |
| Arrival rate for first time compilations 653 | 1005 | 0 | 0 | 0 | 0 | 0 |
| Arrival rate of recompilation requests | 5 | 0 | 0 | 1 | 0 | 0 |
| Class loading rate | 250 | 0 | 0 | 1 | 0 | 0 |
| Samples in compiled code | 25 | 1 | 0 | 1 | 1 | 1 |
| Samples in interpreted code | 0 | 0 | 1 | 1 | 1 | 1 |
| Number of active threads | 5 | 1 | 0 | 1 | 1 | 1 |
| CPU utilization of executing process | 5 | 1 | 0 | 0 | 0 | 0 |
| Duration in steady stage | 0 | 0 | 0 | 0 | 0 | 0 |
|  |  | 5 | 1 | 5 | 3 | 3 |

VIRTUAL MACHINE STAGE DETECTION

BACKGROUND OF THE INVENTION

1. Field of the Invention

The present invention relates generally to a data processing system, and computer program product for determining status of a virtual machine. More specifically, the present invention relates to adapting algorithms, strategies or heuristics in a data processing system in response to the level and type of activity performed in a virtual machine hosted therein.

2. Description of the Related Art

A computer, especially one that hosts compartmentalized virtual machines, can evolve the status of its execution from the moment of powering on to the moment that it is powered off. In a data processing system that hosts multiple virtual machines, each virtual machine can be assigned a client, where an organization relies on the virtual machine to support data processing functions of the organization.

As is common, a data processing system can be split among several clients. Each client contracts with the owner of the data processing system. Accordingly, for each client, in order to achieve its business objectives, one or more virtual machines are started. Before long, each virtual machine may achieve a steady state of processing client tasks. Eventually, each virtual machine may reach an idle state, where activity is minimized, for example, because a business day is concluded.

Recognizing when a virtual machine has transitioned among stages can be beneficial, since each stage brings new problems and opportunities.

SUMMARY OF THE INVENTION

The present invention provides a system and computer program product for categorizing a virtual machine stage based on a set of virtual machine metrics that are easy to obtain. A data processing system starts a virtual machine. It sets factor-stage ranges, wherein for each combination factor and stage, a corresponding range is present, and wherein each range is at least as broad as a reset range. It sets a frequency for sampling virtual machine metrics and samples virtual machine metrics, consistent at a frequency, to form a plurality of virtual machine metrics for each factor. It applies a value to each range satisfied by each virtual machine metric, to form a plurality of stage-qualifying values corresponding to a range (and a stage). It also sums all stage-qualifying values corresponding to each stage, to form a stage likelihood for each of the stages. The data processing system further selects a stage corresponding/having a highest stage likelihood, among the plurality of stage likelihoods, as the current stage. The data processing system determines if the current range is different from a former range. The data processing system expands each range corresponding to the current stage and may adapt its internal algorithms, responsive to a determination that the current range is different.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6A is a table of factor-stage ranges in accordance with an illustrative embodiment of the invention; and FIG. 6B is a table that compares exemplary virtual machine metrics in accordance with an illustrative embodiment of the invention.

DETAILED DESCRIPTION OF THE PREFERRED EMBODIMENT

Figure 1:
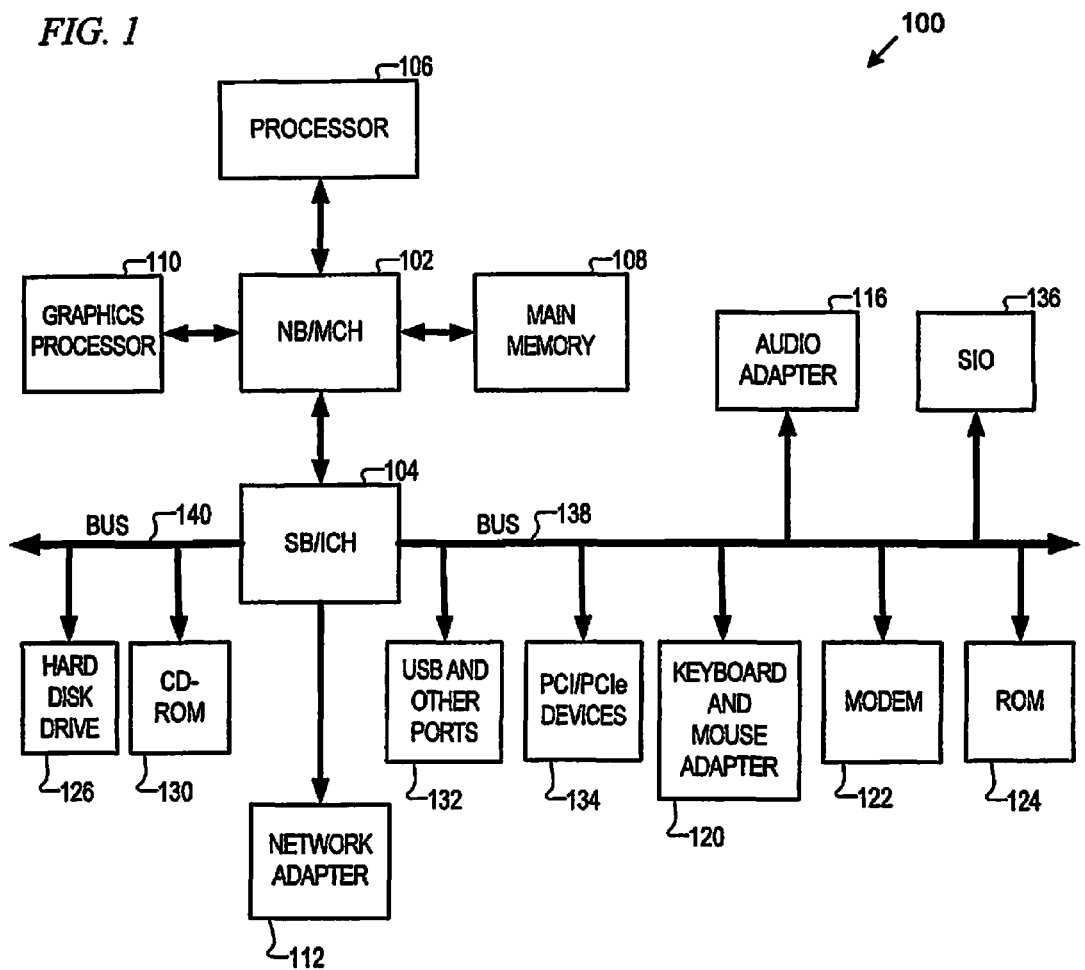
FIG. 1 is a block diagram of a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example. Main memory 108 may be formed of dynamic random access memory, or other forms of volatile memory. Volatile memory is memory that relies on resupplies of charge or other energy carriers in order to record and make accessible data.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106, and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Oracle Corp., Inc. in the United States, other countries, or both.

Instructions for the operating system, the object-oriented programming system, and applications or programs are located on storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus, and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A virtual machine is one or more data structures that emulate physical hardware and are organized by executing computer instructions on a data processing system, such as, for example, FIG. 1 data processing system 100. A virtual machine may rely on portions of physical hardware to provide features such as volatile memory, storage, registers and processing cycles. Occasionally, the underpinning hardware may vary from the virtual machine instantiation. For example, volatile memory, as a physical data processing system resource, can be substituted for, and support, a virtual machine implementation of disk storage. A data processing system resource is a physical circuit, storage device or communication facility that can be used in support of a virtual machine. A virtual machine may be, for example, a Java Virtual Machine (JVM™). JVM is a trademark of Oracle Corp.

Figure 2:
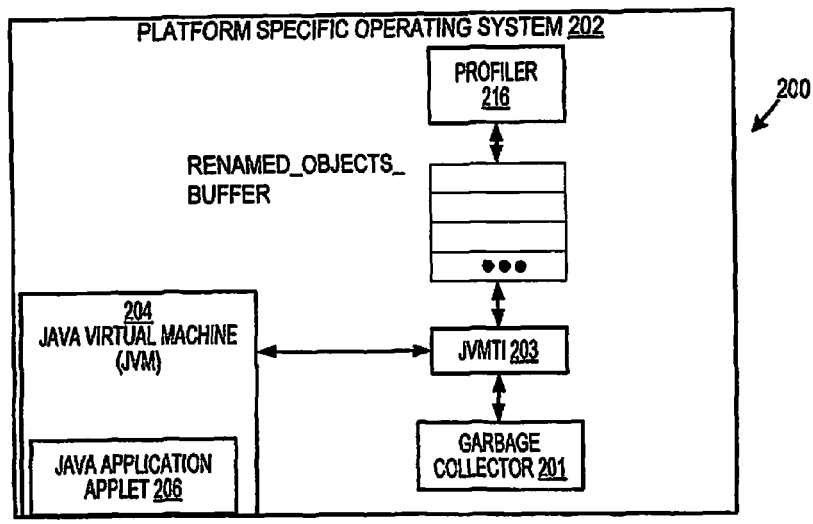
FIG. 2 is a block diagram of the relationship of software components operating within a computer system in accordance with an illustrative embodiment of the invention.

FIG. 2 is a block diagram of the relationship of software components operating within a computer system in accordance with an illustrative embodiment of the invention. Java-based system 200 contains platform specific operating system 202 that provides hardware and system support to software executing on a specific hardware platform. JVM 204 is one software application that may execute in conjunction with the operating system. JVM 204 provides a Java run-time environment with the ability to execute Java application or applet 206, which is a program, servlet, or software component written in the Java programming language. The computer system in which JVM 204 and other software components operate may be similar to data processing system 100 described above. However, JVM 204 may be implemented in dedicated hardware on a so-called Java chip, Java-on-silicon, or Java processor with an embedded picoJava core.

An internal JVM profiler, like profiler 216, is a JVM component that detects Java methods that may consume a significant amount of CPU resources while executing. In one possible implementation, the internal JVM profiler is based on a sampling mechanism which periodically inspects the Java stacks of running threads. At each sampling point, the methods found at the top of the stack receive one more tally. Methods with more tallies are considered to be statistically more active than methods with fewer tallies and may be considered for just-in-time (jit) compilation in order to improve the JVM's performance. Data collected at a sampling point is called a "sample". A sample that falls on a method which runs as interpreted is called an "interpreted sample". Similarly, a sample that is attributed to a Java method which already has been just-in-time compiled is called a "compiled sample". During the incipient stage of a Java application, most of the Java methods are running as interpreted and the expectation is that interpreted samples will predominate. As time goes by, more and more Java methods are jit compiled which can result in a majority of samples being compiled samples.

A class is a description or template for creating instances of objects. The class may include variables, methods, or both. An object is a dynamically created class instance or an array. The allocation of memory and accessing of variables for the object is called instantiation. The manner in which an object is instantiated in written Java code, is to state <Class-name> <object-name>="new"<Class-name>. An object can be a class, in which case, the class defines the manner of making an object. Accordingly, the class is a pattern for creating an object of that type. The class can further define the variables that an instantiated object will contain, as well as the methods of the instantiated object. Every object of that type can use variables and methods declared or described in the class.

A garbage collector (GC) is a JVM component that allows memory occupied by dead objects to be made free for future allocation of objects. The garbage collector, such as garbage collector 201, may consolidate live objects in memory such that free memory is available in at least one larger contiguous block.

At the center of a Java run-time environment is the JVM, which supports many aspects of Java's environment, including its architecture, security features, mobility across networks and platform independence. The JVM is a virtual computer, that is, a computer that is specified abstractly. The specification defines certain features that every JVM must implement, with some range of design choices that may depend upon the platform on which the JVM is designed to execute. For example, all JVMs must execute Java bytecodes and may use a range of techniques to execute the instructions represented by the bytecodes. A JVM may be implemented completely in software or somewhat in hardware. This flexibility allows different JVMs to be designed for mainframe computers and PDAs.

The JVM is the name of a virtual computer component that actually executes Java programs. Java programs are not run directly by the central processor but instead by the JVM, which is itself a piece of software running on the processor. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format. The compiled code is executable on many processors, given the presence of the Java run-time system. The Java compiler generates bytecode instructions that are nonspecific to a particular computer architecture. A bytecode is a machine independent code generated by the Java compiler and executed by a Java interpreter. A Java interpreter is part of the JVM that alternately decodes and interprets a bytecode or bytecodes. These bytecode instructions are designed to be easy to interpret on any computer and easily translated on the fly into native machine code. Bytecodes may be translated into native code by a just-in-time compiler or JIT.

A JVM loads class files and executes the bytecodes within them. The class files are loaded by a class loader in the JVM. The class loader loads class files from an application and the class files from the Java application programming interfaces (APIs) which are needed by the application. The execution engine that executes the bytecodes may vary across platforms and implementations.

One type of software-based execution engine is a just-in-time (JIT) compiler. With this type of execution, the bytecodes of a method are compiled to native machine code upon successful fulfillment of some type of criteria for jitting a method. A just in time completion (or jit) is the conversion of bytecodes of the method to native machine code at runtime. The native machine code for the method is then cached and reused upon the next invocation of the method. The execution engine may also be implemented in hardware and embedded on a chip so that the Java bytecodes are executed natively.

A method is compiled in response to the data processing system receiving a request to compile. A request to compile may occur because another method required the functionality of the method to be compiled or because an internal JVM profiling component detected the method to be critical to performance. The number of compilation requests that a JVM receives can be relevant to the stage in which the JVM currently exists. In addition, the type of compilation is also relevant. Accordingly, the JVM may make a distinction between a first compilation request made for a method and a second compilation request (recompile request) for the method.

When an application is executed on a JVM that is implemented in software on a platform-specific operating system, a Java application may interact with the host operating system by invoking native methods. A Java method is written in the Java language, compiled to bytecodes, and stored in class files. A native method is written in some other language and compiled to the native machine code of a particular processor. Native methods are stored in a dynamically linked library whose exact form is platform specific.

Figure 3:
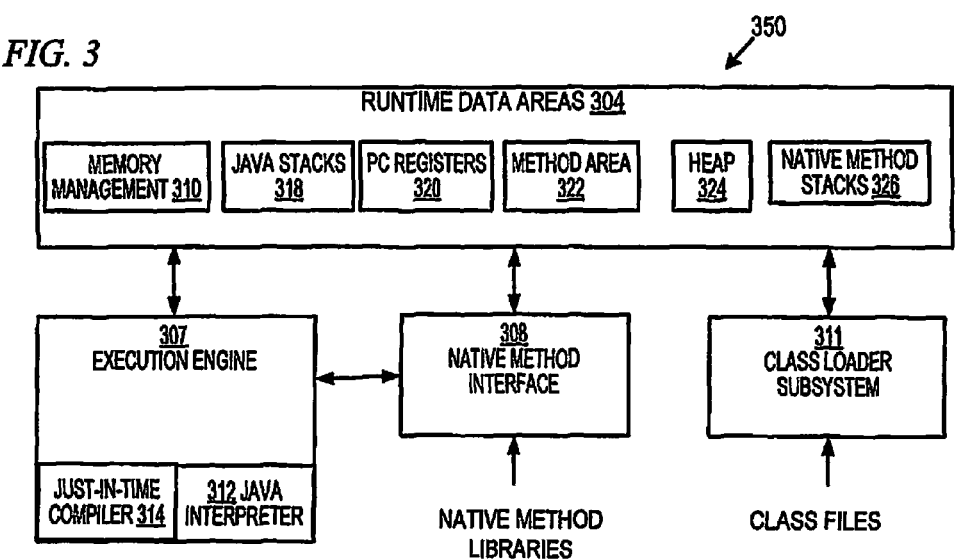
FIG. 3 is a block diagram of a JVM in accordance with an illustrative embodiment of the invention.

FIG. 3 is a block diagram of a JVM in accordance with an illustrative embodiment of the invention. JVM 350 includes class loader subsystem 311, which is a mechanism for loading types, such as classes and interfaces, given fully qualified names. JVM 350 also contains runtime data areas 304, execution engine 307, native method interface 308, and memory management 310. The native method interface can be, for example, a Java Native Interface (JNI). Execution engine 307 is a mechanism for executing instructions contained in the methods of classes loaded by class loader subsystem 311. Execution engine 307 may be, for example, Java interpreter 312 or just-in-time compiler 314. Native method interface 308 allows access to resources in the underlying operating system. Native method interface 308 may be, for example, the Java Native Interface (JNI).

Runtime data areas 304 contain native method stacks 326, Java stacks 318, Program Counter (PC) registers 320, method area 322, and heap 324. These different data areas represent the organization of memory needed by JVM 350 to execute a program.

Java stacks 318 are used to store the state of Java method invocations. When a new thread is launched, the JVM creates a new Java stack for the thread. The JVM performs only two operations directly on Java stacks: it pushes and pops frames. A thread's Java stack stores the state of Java method invocations for the thread. The state of a Java method invocation includes its local variables, the parameters with which it was invoked, its return value, if any, and intermediate calculations. Java stacks are composed of stack frames. A stack frame contains the state of a single Java method invocation. When a thread invokes a method, the JVM pushes a new frame onto the Java stack of the thread. When the method completes, the JVM pops the frame for that method and discards it. The JVM does not have any registers for holding intermediate values; any Java instruction that requires or produces an intermediate value uses the stack for holding the intermediate values. In this manner, the Java instruction set is well defined for a variety of platform architectures.

Program counter (PC) registers 320 are used to indicate the next instruction to be executed. Each instantiated thread gets its own PC register and Java stack. If the thread is executing a method, the value of the PC register indicates the next instruction to execute. If the thread is executing a native method, then the contents of the PC register are undefined.

Native method stacks 326 stores the state of invocations of native methods. The state of native method invocations is stored in an implementation-dependent way in native method stacks, registers, or other implementation-dependent memory areas. In some JVM implementations, native method stacks 326 and Java stacks 318 are combined.

Method area 322 contains class data, while heap 324 contains all instantiated objects. The constant pool is located in method area 322 in these examples. The JVM specification strictly defines data types and operations. Most JVMs have one method area and one heap, each of which is shared by all threads running inside the JVM, such as JVM 350. When JVM 350 loads a class file, it parses information about a type from the binary data contained in the class file. JVM 350 places this type of information into method area 322. Each time a class instance or array is created, the memory for the new object is allocated from heap 324. JVM 350 includes an instruction that allocates memory space within the memory for heap 324 but includes no instruction for freeing that space within the memory. Memory management 310 in the depicted example manages memory space. The memory space is within the memory allocated to heap 324. Memory management 310 may include a garbage collector, which automatically reclaims memory used by objects that are no longer referenced. Additionally, a garbage collector also may move objects to reduce heap fragmentation.

The following definitions will be used in the description of the steps used by illustrative embodiments.

A Class is a combination of methods and data that are encapsulated in a file that defines how data are stored and accessed. A class may form a template from which, instances of running code may be created or instantiated.

A client is an executing program that relies on other entities or executing software to access or process data for the client. In some cases, the data to be processed may be a fully qualified class name, and the result returned may be an instance.

A code object or object is code that may be interpreted, JVM compiled, (i.e. bytecodes), or machine language. It may be an example of a class once instantiated for a specific purpose.

Object Instantiator or ObjectInstantiator is a program or class that creates an instance of an object when executed by a processor. The object created by the Object Instantiator conforms to the concept of an object as defined by Object Oriented Programming (OOP), but in general will be an encapsulated representation of actions and data which may or may not inherit from or allow its action and data to be inherited by other objects. The concept of ObjectInstantiator includes object creator or ObjectCreator.

Figure 4:
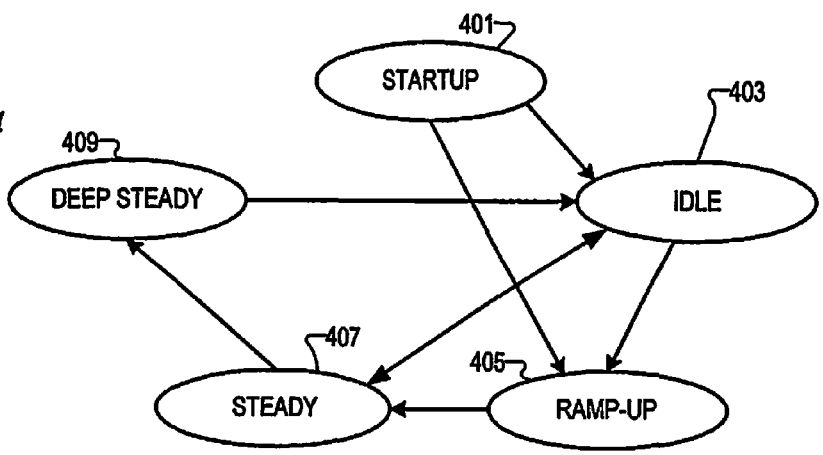
FIG. 4 is a state or stage diagram in accordance with an illustrative embodiment of the invention.

FIG. 4 is a state or stage diagram in accordance with an illustrative embodiment of the invention. A virtual machine stage is a summary descriptor of a data processing system resource usage by a virtual machine. The virtual machine stage may characterize or categorize a state of virtual machine operation along a life cycle or other progression among stages. The virtual machine stage can summarize a plurality of virtual machine metrics in a manner that describes or suggests goals and objectives that a virtual machine may be designed to address. Virtual machine stages can be start-up, idle, ramp-up, and steady. A startup stage can be a stage that a virtual machine performs while loading classes is a predominant function of the virtual machine. For example, startup 401 can be the stage a virtual machine enters once instantiated on a data processing system. In contrast, an idle stage 403 can be a stage that a virtual machine enters when occasional housekeeping is performed in lieu of more active and specialized processing that fulfills a request or task from a client. Stages other than the idle stage are called non-idle stages. Idle 403 can be a precursor to further activity, such as ramp-up stage 405 or steady stage 407. Typically, a virtual machine may spend much of its time in a steady stage 407. A steady stage 407 is a stage where routine activities that are productive for the client occur, beyond those activities associated with the idle stage 403. Further distinctions are explained below. It is appreciated that fewer or more stages may be implemented. For example, a deep steady state 409 can be distinguished from a steady stage 407 by the duration that the virtual machine has behaved relative to a steady stage. Accordingly, when a virtual machine has been in a steady stage for over five minutes, or another predetermined time, the virtual machine may be determined to be in deep steady stage, such as deep steady 409. Each of the stages described in the stage diagram is a hypothetical virtual machine stage. A hypothetical virtual machine stage is a stage that a virtual machine may operate in, and for which a measurable criteria is set, which can select that hypothetical virtual machine stage as the actual and current stage of the virtual machine. Accordingly, the hypothetical virtual machine stage is the selection set of virtual machine stages that a virtual machine or other executed method can select from in order to determine the virtual machine stage.

The illustrative embodiments can include a data processing system to determine for virtual machine metrics associated with virtual machine, which among criteria for a hypothetical virtual machine stage, is met by the one or more virtual machine metrics. Further, the data processing system may determine a count of the criteria met for each among the possible virtual machine stages. Further, the data processing system may determine which virtual machine stage has the most criteria met, and accordingly select that virtual machine stage. Consequently, the data processing system may change an allocation of data processing system resources in response to selecting the selected virtual machine stage. As a result, the data processing system may optimize processing for the virtual machine, or more efficiently allocate data processing system resources among several virtual machines that may simultaneously compete for such resources.

Figure 5:
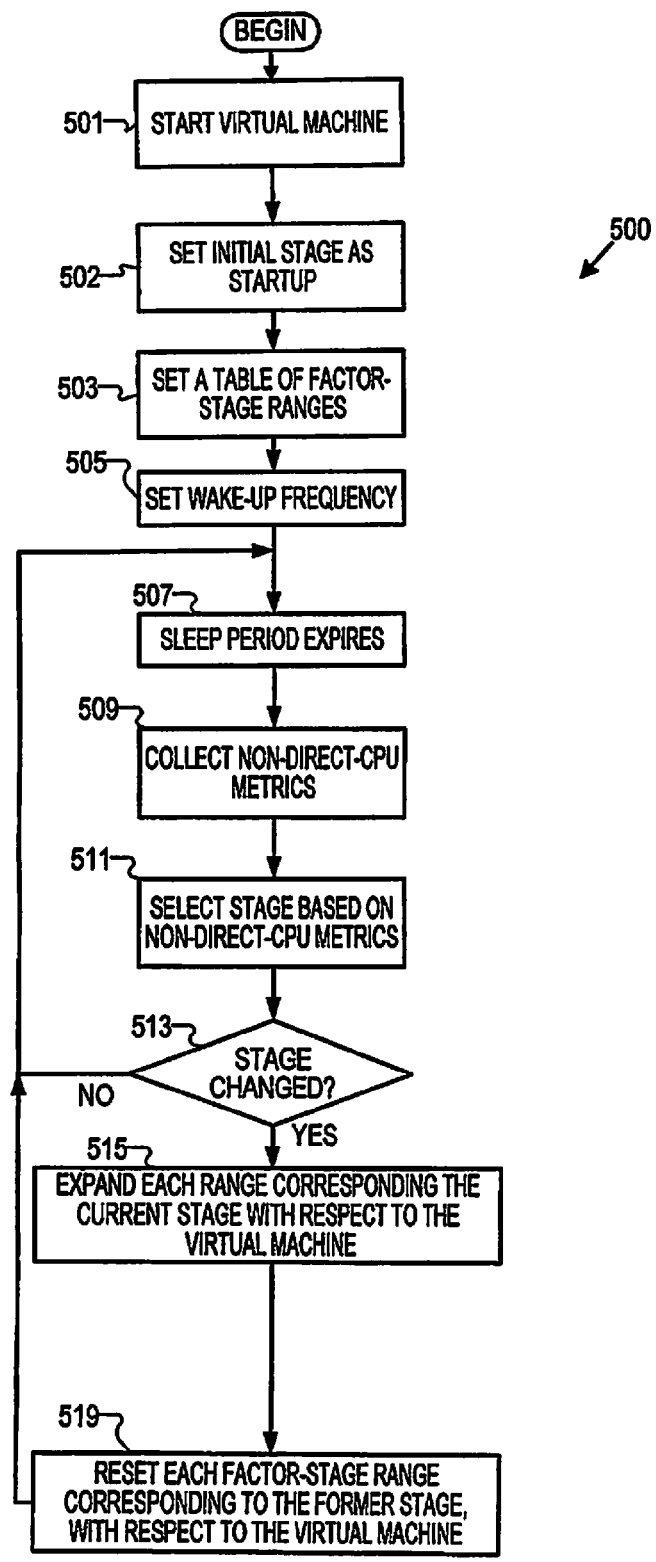
FIG. 5 is a flowchart for collecting virtual machine metrics and making corresponding stage changes in accordance with an illustrative embodiment of the invention.

FIG. 5 is a flowchart for collecting virtual machine metrics and making corresponding stage changes in accordance with an illustrative embodiment of the invention. Initially, the data processing system starts a virtual machine (step 501). This step may be followed by setting the initial stage as STARTUP (step 502). Next, the data processing system may set a table of factor-stage ranges (step 503). A factor-stage range is a range or numeric criteria corresponding to a virtual machine metric and a hypothetical stage. See FIG. 6A, below, for a detailed description of factor-stage ranges. A hypothetical stage is one of several stages that can be candidates for categorizing the virtual machine stage. Some examples of factor-stage ranges include 0-2000, 300 or more, and 0. A factor table is a table that has a factor-stage range for each pairing of virtual machine and a hypothetical range. Accordingly, if the virtual machine metric satisfies the factor-stage range, the virtual machine is stage-qualifying for the corresponding hypothetical stage. In other words, for those virtual machine metric and stage combinations that are met by a currently measured virtual machine metric, the virtual machine qualifies, at least for that virtual machine metric, as being likely to be in the particular stage. Since the factor-stage ranges are just a factor, and not necessarily determinative of the stage, those factor-stage ranges that qualify are factored together, later, to determine if the particular stage is most likely the stage of the virtual machine.

Next, the data processing system may set a wake-up frequency (step 505). The wake-up frequency may be used to periodically trigger the collection or sampling of virtual machine metrics by the virtual machine, task which is typically performed on a dedicated thread called the "sampling thread". Further processing may determine if such virtual machine metrics signal a new stage to which the virtual machine has transitioned.

Next, the sampling thread sleeps. In response to the sleep period expiring (step 507) further action may be taken. The sleep period corresponds to the wake-up frequency, set earlier. When the sleep time expires, the virtual machine may collect non-direct central processing unit (or non-direct CPU) metrics (step 509). A non-direct-CPU metric is a virtual machine metric that is not based on hardware performance counters available in modern CPUs. Accordingly, the non-direct-CPU metric is a metric obtainable without resorting to use of a kernel device driver. While most virtual machine metrics can be directly obtained from the internal data structures of the virtual machine itself—and thus can be inquired very cheaply—some need operating system support. An example of such a virtual machine metric requiring operating system support is the CPU utilization.

Next, the virtual machine may select a stage based on the virtual machine metrics, such as the non-direct-CPU metrics (step 511). This step may be performed as three substeps. First, the virtual machine may apply a value to each range satisfied by each virtual machine metric, to form a plurality of stage-qualifying values corresponding to a factor-stage range. For example, a factor-stage range that is satisfied may be assigned a value of 1, while any such factor-stage range that is unsatisfied, may be assigned a value of 0. A higher value may be used when a factor-stage range is preferred to be weighted heavier relative to other factor-stage ranges. A smaller value may be used if the factor-stage range is intended to be de-emphasized relative to other factor-stage ranges.

Second, the virtual machine may sum all stage-qualifying values corresponding to each stage (or hypothetical stage), to form a stage likelihood for each of the stages. In other words, the stage likelihood is the sum of all stage-qualifying values applicable to a hypothetical stage. Third, the virtual machine may select a stage corresponding to a highest stage likelihood, among a plurality of stage likelihoods, as the current stage. In other words, the virtual machine, having obtained a stage likelihood for all hypothetical stages (for example, startup, idle, ramp-up, steady and deep steady), may select the stage having the highest stage likelihood. Further actions can be taken to optimize the virtual machine's performance for the selected stage, or alternatively, cost-reducing the operation of the virtual machine, if the stage suggests that some real-time performance is better sacrificed in order to avoid costs.

Next, the virtual machine may determine whether the current stage is changed (step 513). If the virtual machine determines that there is no change to the current stage, the virtual machine may return to sampling the virtual machine metrics on a frequency in step 507. However, a positive result at step 513 may result in the virtual machine expanding each range corresponding to the current stage (step 515). As such, future comparisons to a factor-stage range may be more likely to be met for the current range. This feature can provide a degree of hysteresis and prevent unwanted frequent switching between stages.

Hysteresis can be further enhanced. Next, the virtual machine may reset each factor-stage range corresponding to the former stage, with respect to the virtual machine (step 519). Resetting involves placing each factor-stage range applicable to the former stage to values or criteria existing prior to performing step 515. Accordingly, the virtual machine metrics may become more remote from the edge cases of each factor-stage range. The combined effect of steps 515 and 519 may cause the virtual machine metrics to be further embedded within factor-stage ranges of the current stage, while the former factor-stage ranges recede from the currently measured virtual machine metrics. The expansion of the factor-stage range can be to an upper limit, a lower limit, or to both, provided multiple limits exist in the factor-stage range. In addition, where there is no upper limit or no range is applicable to the factor stage range, that specific factor-stage range is not expanded.

FIG. 6A is a table of factor-stage ranges in accordance with an illustrative embodiment of the invention. Each factor-stage range table can be set at a time near the instantiation of the virtual machine. In addition, the factor-stage range table may be set independently for each virtual machine, and accordingly, may be dynamically revised to provide hysteresis for stages selected for each virtual machine. Factor-stage range table 600 may be comprised of nine factors that, when combined, may be used as a basis for stage selection of the virtual machine. Number of pending JIT compilation requests 601 is an indication of the JIT compilation requests that are not yet complete. The number can be obtained from a just-in-time compiler such as JIT compiler 314 of FIG. 3.

The arrival rate for the first time compilations is a number of first time compilations received by the JIT compiler from the previous sampling period, divided by the period of sampling. Similarly, the arrival rate of recompilation requests is the number of such recompilation requests divided by the period of sampling.

A class loading rate 604 can be obtained from class loader 311. The number of classes loaded during the period is divided by the period to obtain this rate. When determining if the factor-stage range corresponding to class loading rate and idle 622 stage is satisfied, the virtual machine may determine whether any classes were loaded during the period. Accordingly, a single test is performed, rather than determining if the virtual machine metric falls between two values.

Samples in compiled code 605 is the number of profiling samples since the last inspection that the internal JVM profiler mechanism 216 attributes to methods that are already jit compiled.

Samples in interpreted code 606 is the number of profiling samples since the last inspection that the internal JVM profiler mechanism 216 attributes to methods that are still running as interpreted.

The number of active threads 607 is the number of application threads created by the virtual machine that are actively performing some useful tasks and contributing to the application's progress. In contrast, non-active threads are just waiting for work without consuming CPU cycles. Similarly, the CPU utilization of executing process 608 is the percentage of CPU cycles, among the CPUs or cores in the data processing system, that are allocated to the virtual machine.

The virtual machine metric, "duration in steady stage" is the number of minutes that the virtual machine has persistently been in the steady stage or deep steady stage.

FIG. 6B is a table that compares or summarizes the comparison of exemplary virtual machine metrics in accordance with an illustrative embodiment of the invention. For example, a sampling period may yield 1005, 1005, 5, 250, 25, 0, 5, 5 and 0 each for number of pending JIT compilation requests, arrival rate for first time compilations, arrival rate of recompilation requests, class loading rate, samples in compiled code, samples in interpreted code, number of active threads and CPU utilization of executing processes, respectively. The duration in steady state may be not available or undefined.

Accordingly, stage-qualifying values can be determined. For example, the stage-qualifying value of 1 680 for meeting criteria of the factor-stage range corresponding to number of pending JIT compilation requests 651 and startup stage 656 is '1' since the virtual machine metric, 1005, satisfies the range 0-2000 640 of FIG. 6A. In addition, the table provides a sum of the stage-qualifying values for each hypothetical stage as a set of stage likelihoods 690. For the virtual machine metrics 655, corresponding stage likelihoods have a highest stage likelihood corresponding to the ramp-up stage. Accordingly, the virtual machine may select ramp-up as the current stage.

Various responses are possible once a current stage is selected. For example, the virtual machine may reduce the frequency of its background housekeeping activity in response to selecting the idle stage. The reduction in frequency is in comparison to the housekeeping activity occurring in non-idle stages. This response can save a customer or other owner of the virtual machine from having to pay for CPU cycles during idle periods. Moreover, this may allow the operating system to remove the image of the virtual machine from volatile memory and replace it with other active applications.

A response to determining the virtual machine to be in startup stage may include inhibiting profiling of a Java virtual machine (JVM). Another response could be to postpone the jit compilation or to lower the optimization effort during just-in-time compilations in order to provide a better startup experience to the customer or reduce the downtime after a scheduled event, like a software upgrade, or an unforeseen event, like a hardware or software malfunction.

Yet another example of responsive optimization can include a response to the following situation. Initially, the virtual machine may be in the startup stage, as selected by, for example, the steps of flowchart 500. In such a startup stage, the virtual machine should refrain from allocating a relatively large amount of memory. The virtual machine may further sample, apply values or set of stage likelihoods to each range satisfied by virtual machine metrics, sum such values in a manner to select the current stage to be the steady stage. In response to such a transition, the virtual machine may choose the use internal algorithms that favor execution speed over memory footprint.

Still another responsive optimization can include a response to determining steady stage or deep steady stage. As an initial step to reaching deep steady stage, the virtual machine may determine if continuous execution in the steady stage has reached a predetermined time. Accordingly, in response to determining that the predetermined time condition is met, the virtual machine may inhibit just-in-time (JIT) compilation or method profiling. Method profiling is the activity of collecting information about the behavior of a method at runtime. Examples of information collected include which paths inside the method are more frequently executed, which targets are more likely referenced by an interface call, etc.

Accordingly, by the methods and apparatus disclosed above, a data processing system hosting one or more virtual machines, can characterize each virtual machine to a specific stage. Once a stage is known, additional optimizations may be performed consistent with a client's preferences, or alternatively, the preferences of an owner or operator of the data processing system. Thus, the optimizations may be adjusted dynamically to suit the varying goals that may be assigned to each stage during a virtual machine's life cycle.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product to categorize a virtual machine stage, the computer program product comprising: a computer readable tangible storage device having computer readable program code embodied therewith, the computer readable program code comprising:
   computer readable program code configured to start a virtual machine;
   computer readable program code configured to set factor-stage ranges, wherein for each combination factor and stage, a corresponding range is present, and wherein each range is at least as broad as a reset range;
   computer readable program code configured to set a frequency for sampling virtual machine metrics;
   computer readable program code configured to sample virtual machine metrics, consistent at a frequency, to form a plurality of virtual machine metrics for each factor;
   computer readable program code configured to apply a value to each range satisfied by each virtual machine metric, to form a plurality of stage-qualifying values corresponding to a range;
   computer readable program code configured to sum all stage-qualifying values corresponding to each stage, to form a stage likelihood for each of the stages;
   computer readable program code configured to select a stage corresponding to a highest stage likelihood, among the plurality of stage likelihoods, as a current stage;
   computer readable program code configured to determine if the current stage is different than a former stage; and
   computer readable program code configured to expand each range corresponding to the current stage, responsive to a determination that the current stage is different.

2. The computer program product of claim 1, wherein the virtual machine metric is a non-direct central processing unit virtual machine metric.

3. The computer program product of claim 1, wherein the computer readable program code configured to select the stage comprises computer readable program code configured to select a startup stage; and
   computer readable program code configured to reduce the optimization effort of at least one method, responsive to selecting the startup stage.

4. The computer program product of claim 1, wherein the computer readable program code configured to select the stage comprises computer readable program code configured to select a startup stage; and
   computer readable program code configured to postpone a just-in-time compilation of at least one method, responsive to selecting the startup stage.

5. The computer program product of claim 1, wherein the computer readable program code configured to select the stage comprises computer readable program code configured to select an idle stage, and the computer program product further comprises:
   computer readable program code configured to reduce a first housekeeping activity of the virtual machine as compared to second housekeeping activity used in non-idle stages.

6. The computer program product of claim 1, wherein the computer readable program code configured to select the stage comprises computer readable program code configured to select a startup stage, and the computer program product further comprises:
   computer readable program code configured to inhibit method profiling in the virtual machine.

7. The computer program product of claim 1, wherein the computer readable program code configured to select the virtual machine stage comprises computer readable program code configured to select the virtual machine stage comprises selecting the startup stage, the method further comprising:
   computer readable program code configured to allocate a first memory amount to the virtual machine in response to selecting the startup stage;
   further sampling, applying, summing and selecting the steady stage; and
   computer readable program code configured to allocate a second memory amount larger than the first memory amount, responsive to selecting the steady stage.

8. The computer program product of claim 7, the method further comprising:
   computer readable program code configured to determine a continuous execution in the steady stage for a predetermined time; and
   computer readable program code configured to inhibit just in time compilation, responsive to the determination of continuous execution in the steady stage.

9. A data processing system for categorizing a virtual machine stage, the data processing system comprising: a processor, a computer readable memory and a computer readable storage medium having computer readable program code stored therein; the computer readable program code comprising:
   computer readable program code configured to start a virtual machine;
   computer readable program code configured to set factor-stage ranges, wherein for each combination factor and stage, a corresponding range is present, and wherein each range is at least as broad as a reset range;
   computer readable program code configured to set a frequency for sampling virtual machine metrics;
   computer readable program code configured to sample virtual machine metrics, consistent at a frequency, to form a plurality of virtual machine metrics for each factor;
   computer readable program code configured to apply a value to each range satisfied by each virtual machine metric, to form a plurality of stage-qualifying values corresponding to a range;
   computer readable program code configured to sum all stage-qualifying values corresponding to each stage, to form a stage likelihood for each of the stages;
   computer readable program code configured to select a stage corresponding to a highest stage likelihood, among the plurality of stage likelihoods, as a current stage;
   computer readable program code configured to determine if the current stage is different than a former stage; and
   computer readable program code configured to expand each range corresponding to the current stage, responsive to a determination that the current stage is different.

10. The data processing system of claim 9, wherein the virtual machine metric is a non-direct central processing unit virtual machine metric.

11. The data processing system of claim 9, wherein the computer readable program code configured to select the stage comprises computer readable program code configured to select a startup stage, wherein the startup stage is a stage that a virtual machine performs while loading at least one class; and computer readable program code configured to reduce the optimization effort of at least one method, responsive to selecting the startup stage.

12. The data processing system of claim 9, wherein the computer readable program code configured to select the stage comprises computer readable program code configured to select a startup stage; and computer readable program code configured to postpone a just-in-time compilation of at least one method, responsive to selecting the startup stage.

13. The data processing system of claim 9, wherein the computer readable program code configured to select the stage comprises computer readable program code configured to select an idle stage, wherein the idle stage occurs during a virtual machine performing housekeeping, and the data processing system further comprises:
   computer readable program code configured to reduce a first housekeeping activity of the virtual machine as compared to a second housekeeping activity used in non-idle stages.

14. The data processing system of claim 9, wherein the computer readable program code configured to select the stage comprises computer readable program code configured to select a startup stage, and the data processing system further comprises:
   computer readable program code configured to inhibit method profiling in the virtual machine.

15. The data processing system of claim 9, wherein the computer readable program code configured to select the virtual machine stage comprises computer readable program code configured to select the virtual machine stage comprises selecting the startup stage, the method wherein the processor further executes computer usable code to computer readable program code configured to allocate a first memory amount to the virtual machine in response to selecting the startup stage; further sample, apply, sum and select the steady stage; and computer readable program code configured to allocate a second memory amount larger than the first memory amount, responsive to selecting the steady stage.

16. The data processing system of claim 15, the method wherein the processor further executes computer usable code to determine a continuous execution in the steady stage for a predetermined time; and computer readable program code configured to inhibit method profiling, responsive to the determination of continuous execution in the steady stage.

* * * * *